United States Patent [19]
Little

[11] 3,739,857
[45] June 19, 1973

[54] TURF PLUG REMOVER
[76] Inventor: James E. Little, 8008 Greeley, Kansas City, Kans. 66109
[22] Filed: Sept. 24, 1970
[21] Appl. No.: 75,081

[52] U.S. Cl. .................................. 172/22, 83/117
[51] Int. Cl. ............................................. A01b 45/02
[58] Field of Search .................... 172/19, 21–22; 111/1–3, 89; 83/116, 117, 123; 30/128, 130, 306

[56] References Cited
UNITED STATES PATENTS

| | | | |
|---|---|---|---|
| 2,088,118 | 7/1937 | Schillo | 83/117 |
| 2,496,468 | 2/1950 | Hanson | 83/116 |
| 2,525,987 | 10/1950 | Williamson | 83/117 |
| 1,874,768 | 8/1932 | Lewis | 172/22 |
| 2,088,209 | 7/1937 | Nolte | 172/22 |
| 2,768,570 | 10/1956 | Strid | 172/22 |
| 3,022,833 | 2/1962 | Reaser | 172/22 |
| 3,235,011 | 2/1966 | Pasinski et al. | 172/19 |
| 3,429,378 | 2/1969 | Mascaro | 172/22 |
| 3,589,319 | 6/1971 | Peters | 172/22 |

FOREIGN PATENTS OR APPLICATIONS

| | | | |
|---|---|---|---|
| 609,503 | 1/1935 | Germany | 172/22 |

*Primary Examiner*—Robert E. Pulfrey
*Assistant Examiner*—Stephen C. Pellegrino
*Attorney*—J. David Wharton

[57] ABSTRACT

A cylindrical member with radially projecting, tubular plug cutters disposed in opposite pairs and containing pistons interconnected by a rigid rod. As the member rolls over the ground, each cutter is sequentially moved into and out of a ground penetrating position. Movement of a plug upwardly in a cutter relative to the cutter shifts both pistons of the pair upwardly ejecting a previously removed plug from the opposite cutter.

An alternate embodiment without pistons utilizes the force of each succeeding plug severed by a cutter upon penetration of the latter to directly engage a preceding plug ejecting it from the cutter. A conical baffle deflects the ejected plugs from the member.

7 Claims, 9 Drawing Figures

PATENTED JUN 19 1973 3,739,857

INVENTOR.
James E. Little
BY Don M. Bradley
ATTORNEY

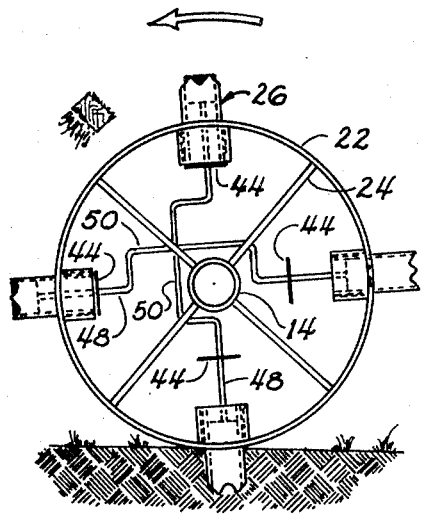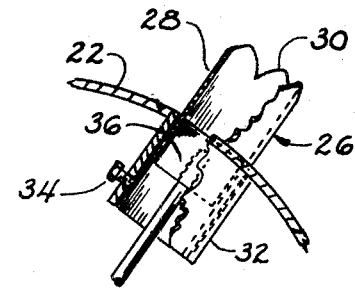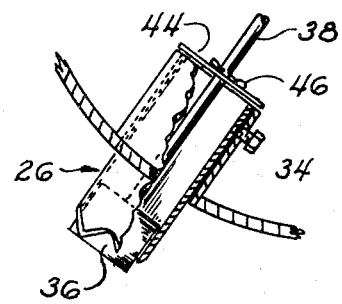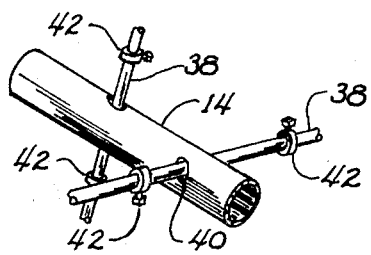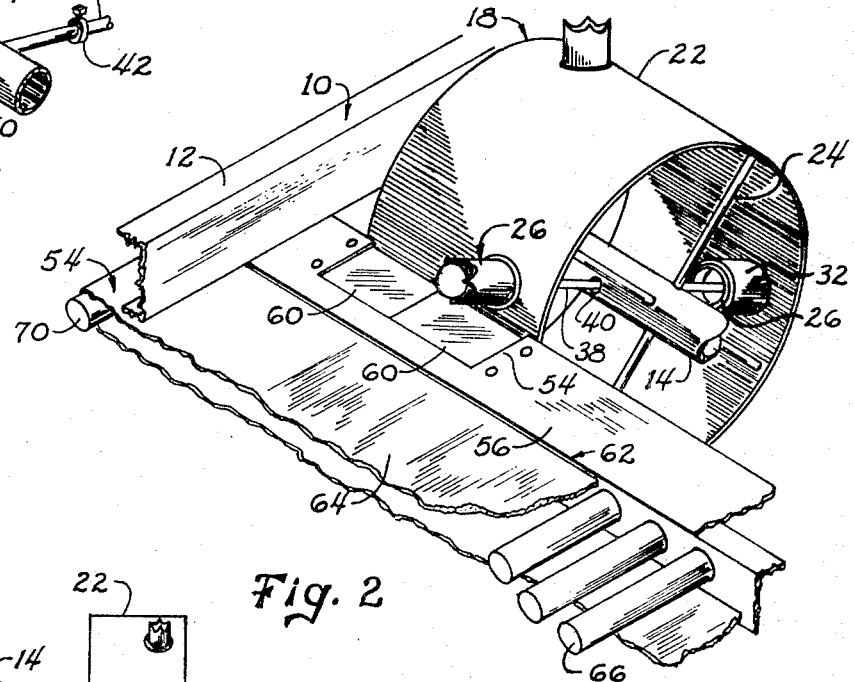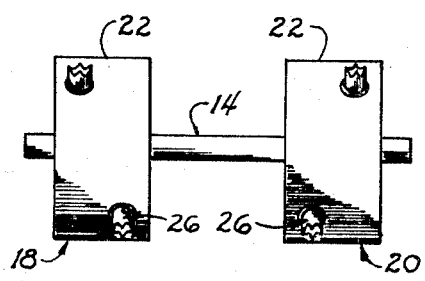

TURF PLUG REMOVER

This invention relates to agricultural equipment, and more particularly, to apparatus for removing plugs from a growing turf for subsequent transplanting.

It is common practice to transplant plugs from an existing turf to establish a new turf in another location. This procedure is often utilized for establishing certain types of grasses in lawns, golf courses or the like. While the practice has proven quite successful, much of the work in removing the plugs from the existing turf has been manual. Previous attempts to develop machinery for this purpose have failed or have resulted in complicated, expensive machines which are not very well suited to use on small plots such as lawns or the like. The sheer costs for such machines has rendered them relatively unavailable to the average homeowner.

Accordingly, it is a primary object of this invention to provide apparatus for removing plugs from turf which may be relatively economically constructed from readily available materials, is simple to operate with relatively unskilled labor and which requires a minimum of maintenance.

Another important object of the invention is to provide apparatus of this type which utilizes the force of the relative movement of the cutters upon penetration into the soil for ejecting plugs from the cutters, thereby obviating any need for auxiliary motivating means for this purpose.

Still another object of the invention is to provide plug removing apparatus which takes advantage of the rolling of the apparatus support for sequentially moving the cutters into ground penetrating positions and positions removed from the soil for ejecting the plugs into a convenient receptacle.

A still further very important object of the present invention is to provide turf plug severing and removing equipment which eliminates substantially all of the manual labor involved in this operation.

These and other important objects of the invention will be further explained or will become apparent from the description, claims and drawings.

In the drawings:

FIG. 2 is an enlarged, fragmentary view similar to FIG. 1, parts being broken away to reveal details of construction;

FIG. 3 is a diagrammatic view of the shaft and cutter mounting members of the machine of FIG. 1;

FIG. 4 is an enlarged, fragmentary transverse, cross-sectional view through a cutter mounting member, parts being broken away to reveal details of construction;

FIG. 5 is a fragmentary, isometric view of a central shaft illustrating the piston connecting rods extending therethrough;

FIG. 6 is an end elevational view of a member and cutter assembly illustrating alternate piston connecting rods and showing one cutter penetrating the soil and a turf plug immediately following ejection from the opposite cutter;

Figure 1:
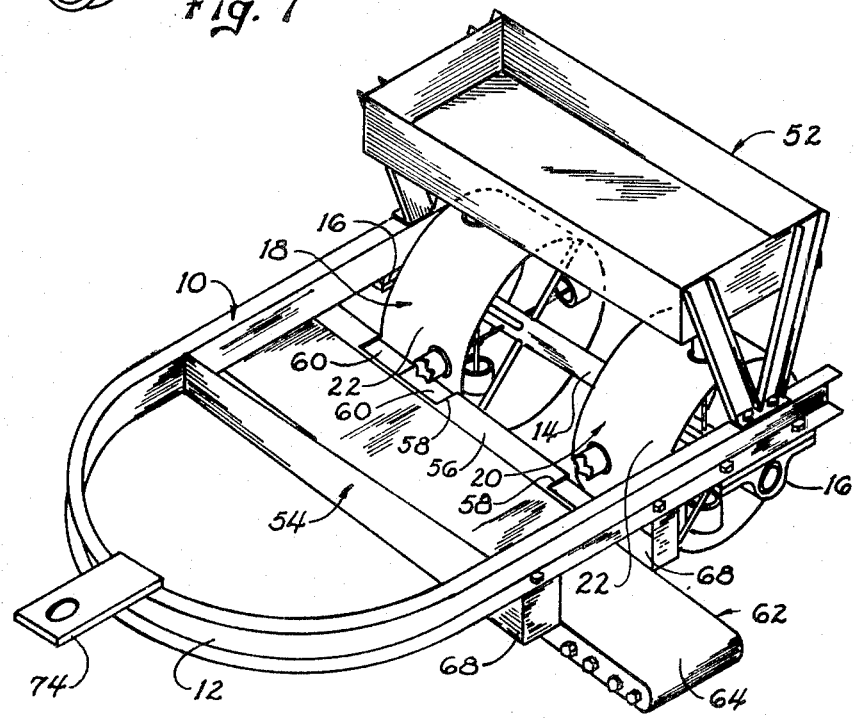
FIG. 1 is a top, front isometric view of a machine embodying the principles of this invention.

Apparatus embodying the principles of this invention includes a machine 10 illustrated in FIG. 1 comprising a U-shaped frame 12 and a transverse axle or shaft 14 journalled to frame 12 by bearings 16. As illustrated in FIGS. 1 and 2, shaft 14 is tubular and extends axially of a pair of spaced apart cylindrical structures 18 and 20. Structures 18 and 20 may be identical in construction. Therefore, it will be necessary to merely describe one of the structures in detail.

Referring now particularly to FIG. 2, structure 18 includes an elongated cylinder 22 mounted on shaft 14 by means of a plurality of radially extending spacers 24. The cylinders 22 are adapted to support the weight of machine 10 as the latter is pulled over the ground. The rolling movement of the cylinders when pulled across the ground successively brings each of a plurality of cutters broadly designated 26 into engagement with the soil. The construction of the respective cutters 26 is illustrated more specifically in FIG. 4 of the drawing. Each cutter 26 includes an elongated tube 28 having a sharpened end 30 mounted in outwardly projecting disposition with respect to cylinder 22. To this end, each cylinder 22 is provided with an opening for each cutter 26 and each such opening is framed by a radially inwardly extending tube 32 which is welded or otherwise secured to the inner surface of cylinder 22.

The tubes 32 telescopically receive the respective tubes 28 and the latter are adjustably secured within their corresponding tubes 32 by set screws 34. Manifestly, the extent of projection of each tube 28 outwardly beyond the imaginary circle defined by the outer surface of cylinder 22 can be adjusted by loosening the set screws 34 and shifting the tubes 28 outwardly or inwardly radially of the cylinder as may be required.

End 30 of tube 28 may be scalloped as shown in the drawing to enhance penetration of the respective cutters into the soil.

Each tube 28 slidably receives a piston 36 adapted for movement within the respective tubes longitudinally of the latter. It will be noted particularly in FIG. 4 that the pistons 36 have a relatively long side wall to permit the upper surface of each piston to move to the extreme outermost end of its corresponding tube while maintaining precise axial alignment of each piston in its tube.

The cutters 26 for machine 10 are disposed in a plurality of pairs with the cutters of each pair disposed in substantial alignment at opposite sides of the cylinder. Further, the pistons of each aligned pair of cutters are rigidly interconnected by an elongated rigid rod 38 secured at opposite ends to the corresponding pistons. This construction insures that the pistons of each pair thereof move simultaneously and in the same direction for a purpose to be hereinafter described.

Each cylinder 22 of machine 10 is shown having two pairs of opposed cutters 26. It will be understood by those skilled in this art, however, that any desired number of pairs of cutters may be provided. The number of cutters chosen will, of course, depend upon the relative spacing desired between the plugs removed from the soil. In the embodiment illustrated, the pairs of cutters are disposed in positions rotated 90° with respect to each other so that the cutters are spaced relatively uniformly around the cylinders. The pairs or cutters are spaced apart longitudinally of the cylinders so that the plugs removed from the turf will be laterally offset from one another.

In the embodiment illustrated in FIGS. 1, 2 and 4, the rods 38 pass through openings 40 in shaft 14 so that the rods are permitted to move transversely of the shaft during operation of the machine. As illustrated in FIG. 5, each rod is provided with an adjustable collar 42 on each side of shaft 14 to limit the extent of shifting movement of the rods 38 in either direction. Here again, it will be obvious to those skilled in the art that the extent of such permissible shifting movement may be easily adjusted through selection of the placement of the collars 42 on their respective shafts.

Alternately, means other than collars 42 can be used to limit the movement of rods 38. For example, as illustrated in FIG. 4, a washer 44 of a diameter sufficiently large to insure engagement with the innermost end of tube 28 or tube 32 can be mounted on rod 38 in proximity to the respective cutters by means of a cotter key 46 or the like. It will be apparent that the extent of outward movement of each piston 36 is limited by engagement of a corresponding washer 44 with either tube 28 or tube 32.

The FIG. 6 embodiment illustrated a construction wherein the cutter pistons are interconnected by elongated rigid rods 48. In this case, however, the rods 48 are pro-vided with intermediate U-shaped offset segments 50 adapted to clear shaft 14 without necessity for the transverse openings 40. Here again, washers 44 engageable with the corresponding innermost cutter ends limit the extent of movement of the rods and therefore the pistons.

Machine 10 is constructed for removal of plugs from the turf as the cutters are sequentially moved and withdrawn from the turf by rolling movement of the structures 18 and 20 over the ground. It is, of course, important that the cutters penetrate into the soil to sever the plugs from the turf. To this end, an auxiliary weight box 52 is mounted on frame 12 above structures 18 and 20. Any amount of auxiliary weight required for insuring proper penetration of the respective tubes 28 into the soil to sever and remove the plugs therefrom may be carried in box 52. The precise amount of weight desirable for this purpose will depend upon existing soil conditions.

A plug receiver broadly designated 54 is carried by frame 12 immediately forward of the structures 18 and 20. Carrier 54 includes a transversely extending bottom wall 56 secured to frame 12 and provided with a pair of spaced apart notches 58. It should be noted that each notch 58 is sufficiently wide to permit passage of the cutters of the respective structures 18 and 20 past wall 56 during rolling movement of the machine over the ground.

Each notch 58 is closed by a pair of cantilevered resilient flaps 60 having one end secured to wall 56 and the other end projecting toward the adjacent flap. Flaps 60 serve as deflectors for turf plugs removed by the machine as will be more particularly described hereinafter.

Figure 7:
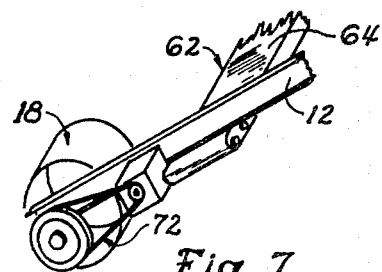
FIG. 7 is a fragmentary, isometric view of the power means for the conveyor of the machine of FIG. 1.

A conveyor 62 forms a part of receiver 54 and includes an elongated continuous belt 64 mounted for movement on rollers 66 carried by cross members 68 secured to frame 12. An end roller 70 (FIG. 2) is powered through a drive 72 operably coupled to cylinder 18 as shown in FIG. 7. Accordingly, rolling movement of structure 18 over the ground powers the conveyor to move the plugs deposited on belt 64. This transfers the plugs transversely of the machine to deposit the plugs in some suitable receptacle or to drop the plugs in a windrow along the path of movement of the machine. It should be noted that the end of conveyor 62 opposite roller 70 projects substantially beyond the proximal side of frame 12.

In operation, machine 10 is pulled over the turf from which it is desired that plugs be removed for transplanting. A forwardly projecting hitch 74 is conveniently provided for attachment of machine 10 to a towing vehicle or the like. Each cutter is rolled into a position so that the weight of the machine and such auxiliary weight as may be provided in box 52 forces the tube 28 to penetrate into the ground. Such penetration severs the turf plug from the adjacent soil. Continued rolling movement of the member carrying the cutter rotates the cutter to a position spaced from the ground. Friction between the tube and the severed plug retains the plug within the tube.

Each cutter is sequentially moved into and out of the ground penetrating positions as a result of continued rotation of members 18 and 20. When the cutter of each pair opposite the cutter which has previously removed a plug from the turf in turn penetrates into the ground, the relative movement of the tube downwardly into the ground brings its piston into engagement with the plug. This moves the piston upwardly into the tube forcing the connecting rod 38 upwardly to move the piston of the other cutter of the pair upwardly in its corresponding tube. This ejects the plug from the uppermost tube as illustrated diagrammatically in FIG. 6 of the drawings.

The cylinders 22 are rotated in the direction of the arrow in FIG. 6 and the plugs are thrown forwardly when they are ejected. Ejection of each plug occurs near or slightly following movement of the respective plug carrying cutters to the extreme uppermost position of their circular paths of travel about shaft 14 so that the plugs fall forwardly onto belt 64. The plugs are prevented from falling through notches 58 by virtue of the deflectors 60 yet the latter swing away from the paths of travel of the cutters to permit the same to pass through the corresponding notches. The plugs may be retained in receiver 54 or they may be delivered to the side of the machine by operation of conveyor 62 as desired.

This operation of the successive penetration of the cutter tubes into the soil followed by removal of the plug and then subsequent ejection of the plug by shifting of the pistons and piston rods through engagement with the soil continues so long as the cylinders are rotated by movement of the machine.

It will be apparent to those skilled in this art that it is not absolutely essential that the cutters be mounted in cylinders such as cylinders 22. Other equivalent structure could be provided to mount the cutters on the periphery of an imaginary circle and projecting outwardly therefrom to take advantage of the sequential penetration and removal of the cutters by rolling movement of the machine. Further, the transversely extending shaft 14 is not an essential member but is provided to facilitate the mounting of the cylindrical members and the rolling movement of the machine over the soil.

Receiver 54 may take the form of a hopper which receives and holds the severed plugs for subsequent removal from the machine.

Figure 8:
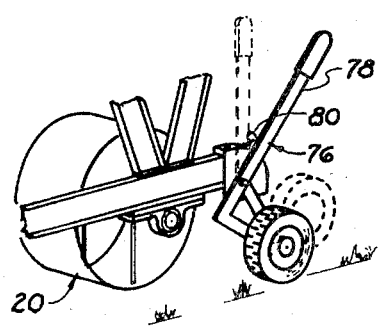
FIG. 8 is a fragmentary, isometric view of the machine equipped with an optional ground wheel.

FIG. 8 illustrates an auxiliary wheel assembly 76 which may be secured to frame 12 for transporting the machine over surfaces where penetration of the cutters into the surface is not desired. To this end, an assembly 76 may be fastened to the frame 12 at a suitable location such as adjacent each projecting end of the U-shaped frame member. Lever 78 is moved from the dotted line position thereof to the full line position to shift the frame upwardly so that the cutter structures 18 and 20 are carried clear of the supporting surface. A releasable lock 80 is provided to hold the assemblies in any desired position.

Figure 9:
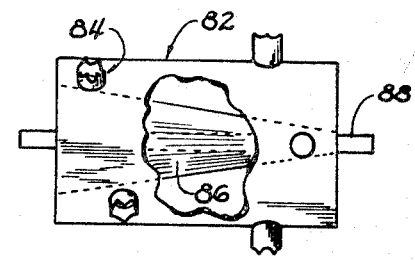
FIG. 9 is a front elevational view of an alternate form of cutter and mounting member assembly, parts being broken away to reveal details of construction.

Referring now to FIG. 9 of the drawing, an alternate embodiment of a cutter member 82 is illustrated partially diagrammatically. Member 82 is constructed to take advantage of the novel severing and removal of plugs of this type from the turf through rolling action of the member across the soil. The cutters 84 of member 82 may be substantially similar to cutters 26 of machine 10. However, it is not absolutely necessary that the cutters 84 be disposed in aligned pairs nor do the cutters 84 have pistons interconnected by rods. Rather, the cutters 84 of member 82 eject the severed plugs from the tubes upon subsequent penetration into the soil. Such penetration brings the upper surface of a subsequent plug into engagement with the lower surface of the preceding plug contained within the tube to force the plug inwardly and from the tube. Sequential penetration of the cutters during rolling movement of the member keeps forcing the severed plugs to the interior of the cylindrical member during rolling movement of the latter.

The severed and ejected plugs engage a conical baffle 86 mounted substantially axially of member 82 whereby the ejected plugs are moved to one side of the member during rolling movement of the member. This discharges the plugs outwardly to the side of member 82 proximal the small end of the conical baffle 86. A shaft 88 has been illustrated in FIG. 9 extending axially of cylindrical member 82. It is contemplated that member 82 might be secured to a suitable frame comparable to frame 12.

While the machine of this invention has been described as particularly useful for removing plugs from an existing, desirable turf for subsequent transplanting elsewhere, it is obvious that it might also be used to form holes in the soil adapted to receive plugs from another location. Thus, the machine can be operated over an area slated for the establishment of a new turf. The plugs of soil which are removed by the cutters leave holes suitable for reception of plugs comprising the beginning of the new turf.

Having thus described the invention, what is claimed as new and desired to be secured by Letters Patent is:

1. Apparatus for removing plugs from turf comprising:
   a pair of open-ended tubular plug cutters, each for penetration of its open end into the soil to sever and remove a plug therefrom;
   a piston slidably received in each cutter respectively, each piston being disposed for engagement by the soil as the corresponding cutter penetrates the soil whereby penetration of the cutter downwardly into the soil forces the corresponding piston upwardly relative to its cutter;
   rotatable means mounting the cutters in spaced relationship for sequential penetration and removal from the soil, whereby one of the cutters of said pair is in a position removed from the soil with its open end extending upwardly while the other cutter is in position to penetrate the soil;
   an elongated rigid rod secured to each piston respectively for movement with said pistons to effect removal of a plug contained in one of the cutters out of the open end of the latter after the plug is removed from the soil and said one cutter is in said position removed from the soil, by moving the piston in said one cutter upwardly in response to movement of the piston in the other cutter upwardly as the latter penetrates into the soil and
   means carried by the rod for limiting movement of the rod with respect to the cutters.

2. The invention of claim 1, wherein movement limiting means includes a pair of abutments carried by the rod, each abutment being disposed for engagement against a corresponding cutter to limit the movement of the rod after the same has moved a predetermined distance toward said corresponding cutter.

3. The invention of claim 1, wherein said cutter mounting means includes an annular member adapted for rolling movement over the turf, said cutters being carried by the member for successive penetration into the turf as the member rolls thereover, and a shaft carried by the member and extending axially thereof, said shaft having a transverse opening disposed to slidably receive the rod through the opening, and wherein said limiting means includes a pair of spaced apart abutments carried by the rod, there being an abutment on each side of the shaft, the abutments being disposed to engage the shaft upon a predetermined amount of movement of the rod in either direction.

4. The invention of claim 1, wherein said rotatable mounting means includes a cylinder, an axle secured in the cylinder, a frame operably coupled to the axle for rotation of the cylinder as the frame is moved along the turf, and means carried by the frame for supporting an auxiliary weight for assisting the penetration of said cutters into the turf.

5. The invention of claim 4, wherein is included a carrier mounted on the frame in disposition to receive the plugs as the latter are ejected from the respective cutters.

6. The invention of claim 5, wherein said carrier includes a conveyor extending transversely of the path of travel of the apparatus, and means operably coupled with the conveyor for operating the latter to discharge the plugs from the carrier.

7. The invention of claim 5, wherein said carrier includes a wall mounted on the frame and disposed in proximity to the outer surface of said cylinder for receiving the plugs discharged from the cutters, said wall being provided with a notch in the path of travel of a cutter and adapted to passage of said cutter therethrough during rotation of the cylinder, and resilient flap means secured to the wall normally in disposition closing said notch to prevent inadvertent passage of plugs therethrough, said flap means being yieldable upon engagement of said cutter therewith to permit movement of the cutter through the notch.

* * * * *